United States Patent
Ho et al.

[11] Patent Number: 5,923,882
[45] Date of Patent: Jul. 13, 1999

[54] CROSS-MODULE OPTIMIZATION FOR DYNAMICALLY-SHARED PROGRAMS AND LIBRARIES

[75] Inventors: W. Wilson Ho, San Mateo; Sun C. Chan, Fremont, both of Calif.

[73] Assignee: Silicon Graphics, Inc., Mountain View, Calif.

[21] Appl. No.: 08/521,027

[22] Filed: Aug. 29, 1995

[51] Int. Cl.$^6$ .................................................. G06F 9/45
[52] U.S. Cl. .......................... 395/709; 395/707; 395/708
[58] Field of Search .................... 395/702, 705, 395/707, 708, 709, 710, 685; 364/280.1, 280.4, 280.5, 973

[56] References Cited

U.S. PATENT DOCUMENTS

| | | | |
|---|---|---|---|
| 5,193,191 | 3/1993 | McKeeman et al. | 395/700 |
| 5,291,601 | 3/1994 | Sands | 395/700 |
| 5,359,721 | 10/1994 | Kempf et al. | 395/425 |
| 5,375,241 | 12/1994 | Walsh | 395/700 |
| 5,375,242 | 12/1994 | Kumar et al. | 395/700 |
| 5,408,665 | 4/1995 | Fitzgerald | 395/700 |
| 5,535,391 | 7/1996 | Hejlsberg et al. | 395/700 |
| 5,583,988 | 12/1996 | Crank et al. | 395/185.01 |
| 5,590,331 | 12/1996 | Lewis et al. | 395/708 |

OTHER PUBLICATIONS

Ho et al., "Optimizing the Performance of Dynamically-Linked Programs," *1995 USENIX Technical Conference on UNIX and Advanced Computing Systems*, New Orleans, LA, Jan. 16–20, 1995, pp. 225–233.

*Primary Examiner*—Tariq R. Hafiz
*Assistant Examiner*—Kakali Chaki
*Attorney, Agent, or Firm*—Sterne, Kessler, Goldstein & Fox P.L.L.C.

[57] ABSTRACT

A system and method of eliminating some of the indirect addressing associated with Position Independent Code (PIC). The invention applies cross-module optimization to dynamic linking of shared libraries. A definition table is built that defines where each symbol within an application program and associated shared library is defined. Also stored in the definitions table is an associated attribute. The definition table is utilized to eliminate indirect addressing wherever possible. As a result, overall system performance is increased.

8 Claims, 4 Drawing Sheets

CROSS-MODULE OPTIMIZATION FOR DYNAMICALLY-SHARED PROGRAMS AND LIBRARIES

BACKGROUND OF THE INVENTION

1. Field of the Invention

The present invention relates generally to optimizing the use of dynamically-shared programs and libraries, and more particularly to a system and method for removing indirect addressing from a main executable (program) that accesses shared programs and libraries by utilizing cross-module optimization to collect information concerning symbol definitions and uses.

2. Related Art

In modern software development, modular design and structured programming are essential for making programs manageable. A key method for the structured organization of programs is the separation of program code into multiple source files, called modules or compilation units. Storing program code in different files facilitates the accessing, editing, sharing and maintenance of these source files. It also eases compilation overhead because only affected modules need to be re-compiled when code is changed. Separate compilation is desirable when several programmers work on the same program and mandatory when different parts of a program are written in different languages. It is the function of a linker/loader to identify and resolve external references and common symbols when the program is finally loaded for execution.

FIG. 1 illustrates the flow of a traditional compiler. Front end(s) 110 supports may different programming languages (e.g., C, Pascal, FORTRAN, ADA, PL/1, COBOL, etc.). In fact, front end 110 may include multiple sources of user code. Front end 110 produces Ucode object 115 (also referred to as intermediate code). Ucode object 115 is optimized by Ucode optimizer 120. Ucode optimizer 120 performs common global optimizations and register allocation on intermediate code to produce an optimized ucode object 125. Code Generator 130 performs local optimization and translates optimized Ucode object 125 to assembly language and symbol table 135. Assembler 140 performs peep-hole optimizations and pipeline scheduling to produce a machine language object file 145. Machine code objects can be stored in libraries 160 or linked directly into a final executable 155 by link editor 150. This process is performed for each separate module of source code.

Separate modules help programmers, but create problems for the optimizing compiler. Optimizers perform best when all of the information regarding a piece of code is available. Under separate compilation, the optimizers do not have complete information because interacting parts of the code exist in separate files. As a result of this problem, techniques to optimize across module and language barriers have been developed (e.g., the MIPS Ucode compiler which compiles code running on the MIPS R3000 processor or other processors within the MIPS family of processors).

It is becoming increasingly common to dynamically-link shared libraries. In general, dynamically-linked programs do not perform as well as statically-linked programs. Statically-linked programs do not by definition change at run-time, whereas dynamically-linked programs may change because of shared libraries and the like. Many UNIX based systems support dynamic linking of shared libraries because they provide many desirable features (See *MIPS Processor Supplement for the System V Application Binary Interface*, Prentice Hall, Englewood Cliffs, N.J. (1990); Arnold, J. Q., "Shared Libraries on UNIX System V," *Proc. Summer Usenix*, pp. 1–10 (1986); Auslander, *IBM Journal of Research and Development* 34(1):98–104 (1990); Coutant and Ruscetta, "Shared Libraries for HP-UX," *Hewlett-Packard Journal*, pp. 46–53 (June 1992); Gingell et al., "Shared Libraries in SunOS," *Proc. Summer Usenix*, pp. 131–145 (Summer 1987)). For example, both disk space and physical memory utilization are reduced due to increased sharing, and shared libraries can be replaced transparently without re-linking all user programs. More in-depth discussions can be found in Gingell, *Unix Review* 7(8):56–66 (1989); Sabatella, "Issues in Shared Libraries Design," *Proc. Summer Usenix*, pp. 11–23 (June 1990). However, the use of dynamic shared libraries does incur a performance penalty. Dynamically-linked programs generally run slower than statically-linked programs because they incur extra run-time overhead. This overhead includes (1) the execution of extra instructions resulted from indirect addressing and run-time symbol resolutions, and (2) extra memory requirement due to poor locality of functions in shared libraries and data structures used by the run-time linker. The present invention is related to overcoming the problem associated with indirect addressing.

Several optimizations have been proposed to improve the performance of shared libraries. For example, run-time overhead in indirect function calls can be improved by reducing the number of instructions used in the calling sequence (see Keppel and Russell, "Faster Dynamic Linking for SPARC V8 and System V.4," Technical Report Dec. 08, 1993, University of Washington (1993)). Symbol resolutions can be deferred and carried out on-demand to improve start-up time (see Sabatella, "Issues in Shared Libraries Design," *Proc. Summer Usenix*, pp. 11–23 (June 1990)). Loading and fixing-up of shared libraries can be cached to reduce the amount of work for subsequent invocations (see Nelson and Hamilton, "Higher Performance Dynamic Linking Through Caching," *Proc. Summer Usenix*, pp. 253–266 (June 1993); Orr et al., "Fast and Flexible Shared Libraries," *Proc. Summer Usenix*, pp. 237–251 (June 1993)). These methods are effective in speeding up the execution of dynamically-linked programs from their corresponding initial implementations. However, there still remains significant performance degradation of these programs when compared with their statically-linked counterparts.

SUMMARY OF THE INVENTION

The present invention applies cross-module optimization to dynamic linking of shared libraries. Disclosed is a system and method of eliminating some of the indirect addressing associated with Position Independent Code (PIC). The present invention invokes cross-module optimization and further builds a definition table. Associated with each symbol in the definitions table is an attribute which includes, for example, information regarding whether a symbol is defined in a dynamic shared library, a machine code object or a ucode object. The definition table is utilized to eliminate (or remove) indirect addressing wherever possible. As a result, overall system performance is increased.

In a preferred embodiment, the present invention provides a system and method for generating machine-code that includes an application program and one or more shared libraries to be executed, wherein the machine-code utilizes direct and indirect addressing. First, intermediate code is generated from source code (i.e., the application program) utilizing cross-module optimization. The source code may include code written in two or more languages. The intermediate code contains information about symbol definitions in the source code. The intermediate code also contains information regarding the one or more libraries that will be linked at run-time. Second, a definitions table is generated that defines where all of the symbol definitions are defined. The definitions table is incomplete, however, since said shared library can change at run-time. This is contrary to traditional cross-module optimization that requires that the definitions table be complete. Next, a machine-code object is generated based on the intermediate code. The machine-code object includes indirect addressing for all definitions in the definitions table that are not within the source code and direct addressing code for all definitions in the definitions table that are within the source code. Finally, the machine-code object is linked to the one or more libraries. The present invention further includes a step of linking the machine-code object with other machine-code objects that have been separately compiled.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed in detail below. While specific configurations are discussed, it should be understood that this is done for illustration purposes only. A person skilled in the relevant art will recognize that other components and configurations may be used without parting from the spirit and scope of the invention. The preferred embodiment of the invention is now described with reference to the figures where like reference numbers indicate like elements. Also in the figures, the left most digits of each reference number corresponds to the figure in which the reference number is first used.

Overview

Dynamically-linked programs reference text and data symbols indirectly, which accounts for a significant performance loss. As a result of indirect referencing more instructions need to be executed. The present invention takes advantage of the information derived from cross-module optimization. Cross-module optimization is described in Chow et al., "Engineering a RISC Compiler System," *Proc. Compcon.*, pp. 132–137 (March 1986); Himelstein, et al., "Cross-Module Optimizations: Its Implementation and Benefits," *Proc. Summer Usenix*, pp. 347–356 (June 1987)). Cross-module optimization in the content of the present invention converts as many indirect address references as possible to direct references.

Environment

In a preferred embodiment, the present invention operates within a MIPS processor environment that implements shared libraries. In particular, SVR4-style shared libraries were utilized to evaluate the performance of the present invention (see System V Application Binary Interface, Prentice Hall, Englewood Cliffs, N.J., 1990). Generally, these libraries support dynamic symbol binding, sharing of text and read-only data among multiple processes, and mapping of the same library to different address spaces in different processes. A full description of the basic implementation of IRIX's shared libraries can be found in *MIPS Processor Supplement for the System V Application Binary Interface*, Prentice Hall, Englewood Cliffs, N.J. (1990). For the sake of brevity, only those implementation details that are relevant to the optimizations presented herein are described below.

Figure 3:
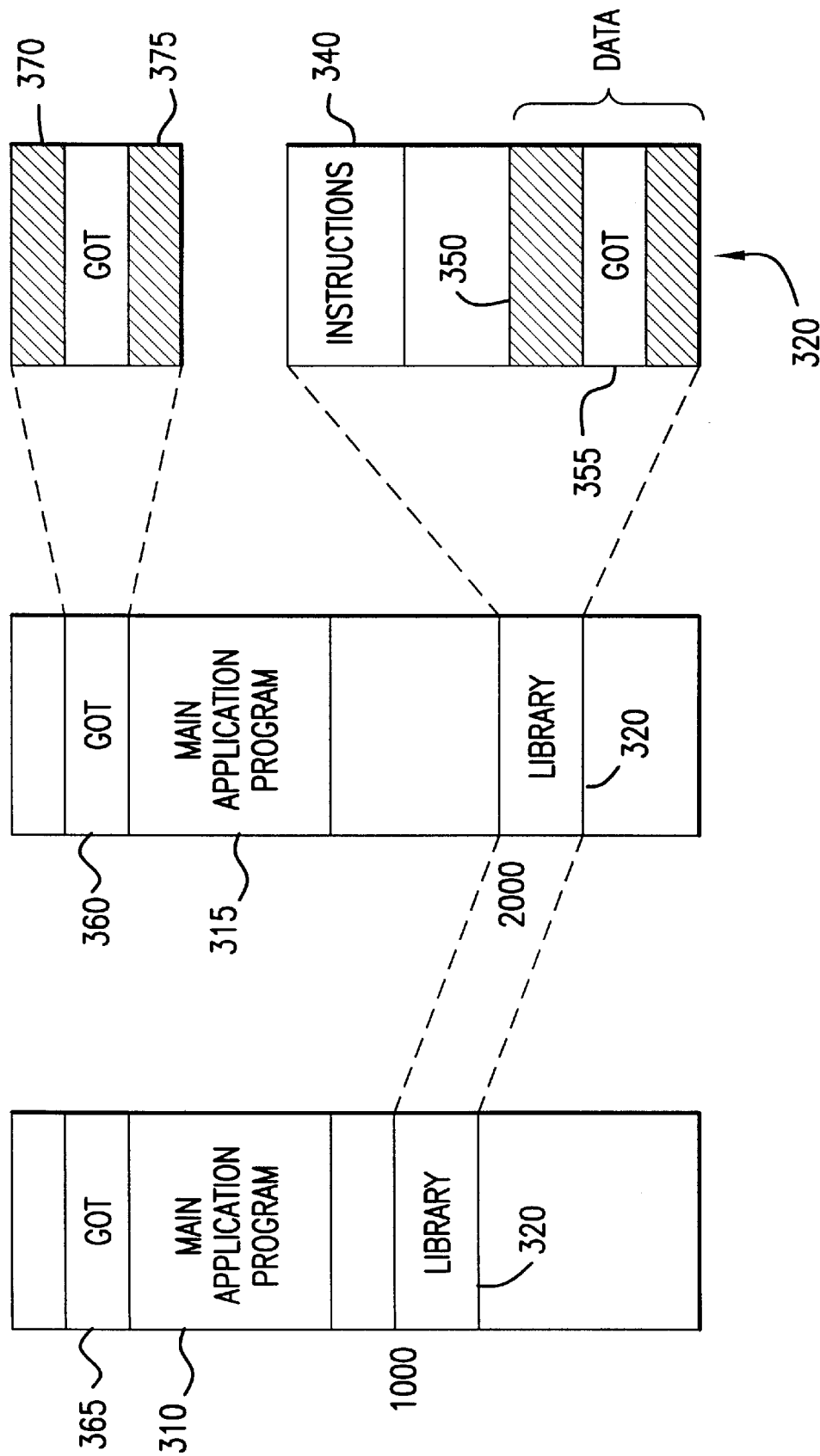
FIG. 3 generally illustrates the concept of shared libraries.

FIG. 3 generally illustrates the concept of shared libraries. Two application programs are shown: main application program 310 and main application program 315. Each application program has code that utilizes direct and indirect addressing. Library 320 is dynamically loaded into the address space of each of these programs at run-time, albeit at potentially different positions within the address space. Library 320 includes instructions 340 and data 350.

The advantage of dynamically-linking library 320 is that there are no constraints placed on where library 320 must be linked within memory. Unfortunately this advantage is countered with the disadvantage that an application program is not always certain of the exact place in memory where data or instructions are stored. As a consequence, dynamically-linking library 320 requires using position independent code (PIC). PIC is essentially an indirect addressing scheme. PIC allows library 320 to be loaded anywhere in memory, while still allowing each application program to retrieve data without having to re-write the code subsequent to linking. PIC is very well known in the art, and for the sake of brevity will not be described in further detail herein.

The dynamically-linked model can be contrasted with the traditional model in which each program was a self contained entity with no sharing of libraries or program modules. The traditional model, of course, has the advantage that references to instructions and data can use direct addressing and not indirect addressing which is substantially slower. That is, all variables could be directly addressed since there location was known at run-time.

A preferred embodiment of the present invention utilizes the IRIX operating system that is utilized by products produced by Silicon Graphics of Mountain View, Calif. However, it is contemplated that the present invention will be implemented in systems that utilize other operating systems. Under the IRIX implementation of shared libraries, the compiler always generates PIC. Thus, any object file created by the compiler can be part of a shared library. PIC is implemented by turning all address references into indirect references through a Global Offset Table (GOT). GOT is created at static-link time and there is one for each shared library, as well as the main application program itself. GOT 355 is located within the data portion of library 320. GOT 365 and GOT 360 are located within main application program 310 and 315, respectively. Similar to GOT 355, it is located within a data portion of memory. Sections 370 and 375 are referred to as the gp-relative data area. For the sake of simplicity, only GOT 355 and 360 will be referenced for the remainder of this document. GOT 360 references variables outside main application 315 and GOT 355 references variables outside library 320.

The GOT's are a table of addresses of all symbols that are referenced, and the content of the GOT is updated by the run-time linker on demand, i.e., deferred binding. Function calls are implemented by first loading the address of the callee (i.e., the function to be called) into a register from the corresponding entry in GOT 360, followed by a jump-and-link-register instruction. By updating its GOT 360 with correct values, the run-time linker can relocate a shared library to any virtual address. The present invention optimizes (i.e, removes indirect addressing) GOT 360, and not GOT 355.

Furthermore, a dedicated register (not shown) is used to hold the address pointing to GOT 360 corresponding to the function being executed. This dedicated register is maintained at run-time. When control is transferred between different shared libraries, the address of GOT is computed by the corresponding callee (or the shared library that defines the callee), and the new value is put in this GOT register. However, when control is passed between functions within the same shared library, the content of the GOT register need not be changed and can be used immediately.

Note that although library 320 can be shared by many programs, only instructions 340 are shared. Data 350, and in particular GOT 360, are not shared. Rather, data 350 and GOT 360 are unique to each application program.

Using PIC allows the text segment to be shared by all processes because it never needs to be modified. The GOT approach localizes all the run-time fix-up of addresses and cuts down the number of copy-on-write memory pages. When compared to the jump table approach in the SunOS compiler (see Gingell et al., "Shared Libraries in SunOS," Proc. Summer Usenix, pp. 131–145 (Summer 1987)), this implementation of function calls requires only one control transfer instead of two. This difference is of particular importance in modern computer architecture (see Heinrich, MIPS R4000 User's Manual, Prentice Hall, Englewood Cliffs, N.J. (1993); Hsu, "Designing the TFP Microprocessor," IEEE Micro, pp. 23–33 (April 1994)), where jumps are in general expensive. Furthermore, the instruction to load addresses from the GOT can often be scheduled to be executed earlier so that other useful work can be done while the address is being fetched from memory. Nevertheless, indirect addressing of all symbol references is costly from a time and computation perspective.

Figure 4:
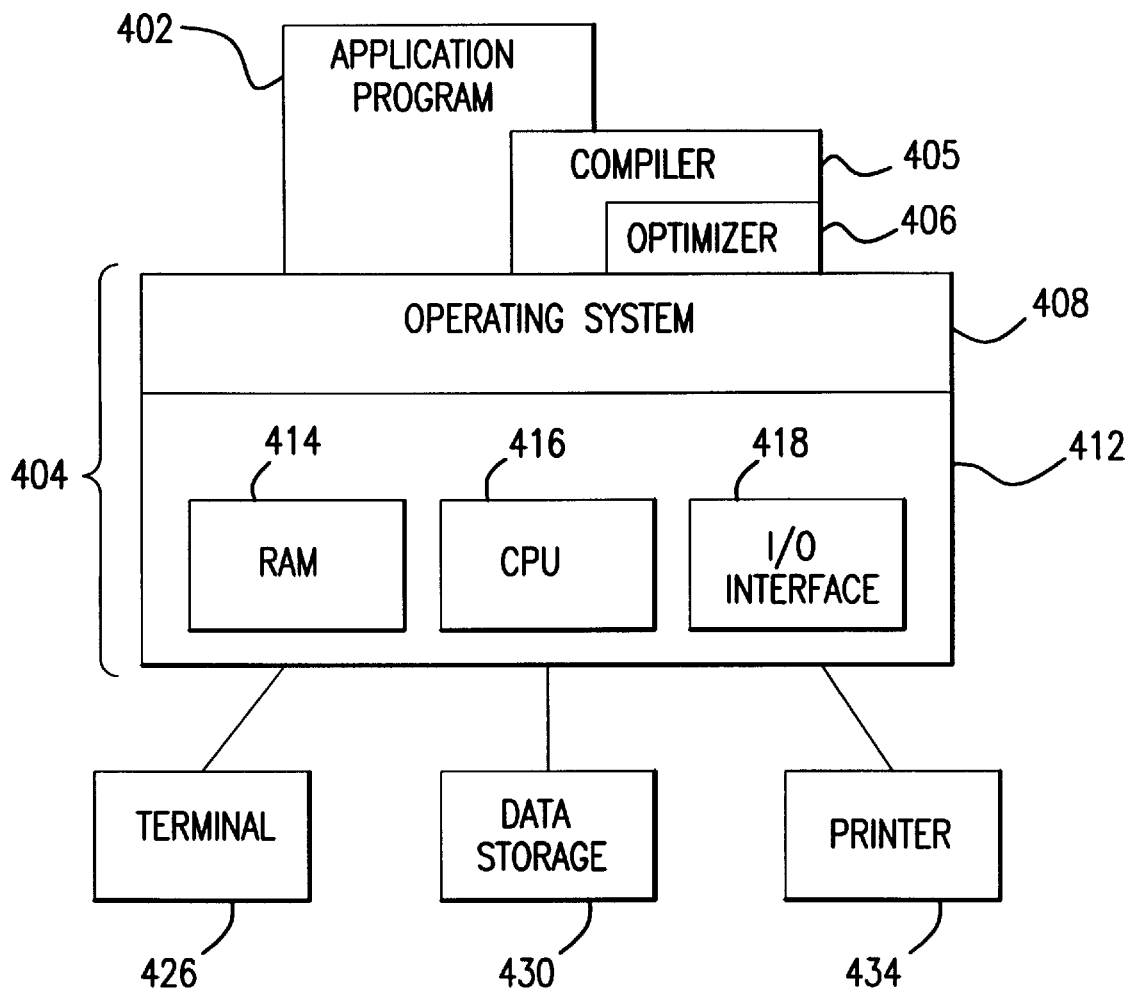
FIG. 4 illustrates an environment in which a preferred embodiment of the present invention operates.

FIG. 4 illustrates an environment in which a preferred embodiment of the present invention operates. A preferred embodiment includes application program 402 and compiler 405, both of which are executed by platform 404. Compiler 405 is configured to transform a source program into object code. Computer platform 404 includes hardware unit 412, which includes multiple central processing units (CPU) 416, random access memory (RAM) 114, and an input/output interface 418. Computer platform 404 includes an operating system 408 (e.g., IRIX). Various peripheral components may be connected to computer platform 404, such as a terminal 426, a data storage device 130 and a printing device 434. The present invention applies to any processor (e.g., RISC and VLIW) that does not have a program counter relative addressing mode. Those skilled in the art will readily appreciate the variety of configurations and systems that can be utilized.

Eliminating Indirect Addressing

As a result of the separate compilation model, all object files generated by the compiler of the present invention are PIC. This feature allows any object file created by the compiler to be put into a shared library. It also relieves programmers from the burden of deciding at compile-time whether a particular object should become part of a shared library or an executable. The present invention provides a system and method for eliminating some of the indirect addressing that is generated when using a PIC. As a result, overall system performance is increased.

Absolute addresses can be assigned to the main executable if the main executable is never relocated at run-time. That is, replace all indirect references within the main executable for symbols defined in the main executable by direct references. This can be achieved if the system guarantees that no shared library is mapped to the address space already used by the executable itself. Unfortunately, under the traditional separate compilation model, the compiler cannot determine if references of undefined global symbols will be resolved with a definition from a shared library or from the main executable itself. Hence, it has to assume the worst case and generate indirect references for all such symbols.

The present invention provides a mechanism for automatically determining whether direct addressing is possible for any given symbol, without requiring any specification from the programmer. That is, the present invention replaces all PIC with code using direct addressing when main application 310 references a variable defined within main application 310. References to variables defined within library 320 must still utilize indirect addressing. The approach is to extend the cross-module optimization phase of the compiler to collect information about where symbols are defined.

Figure 1:
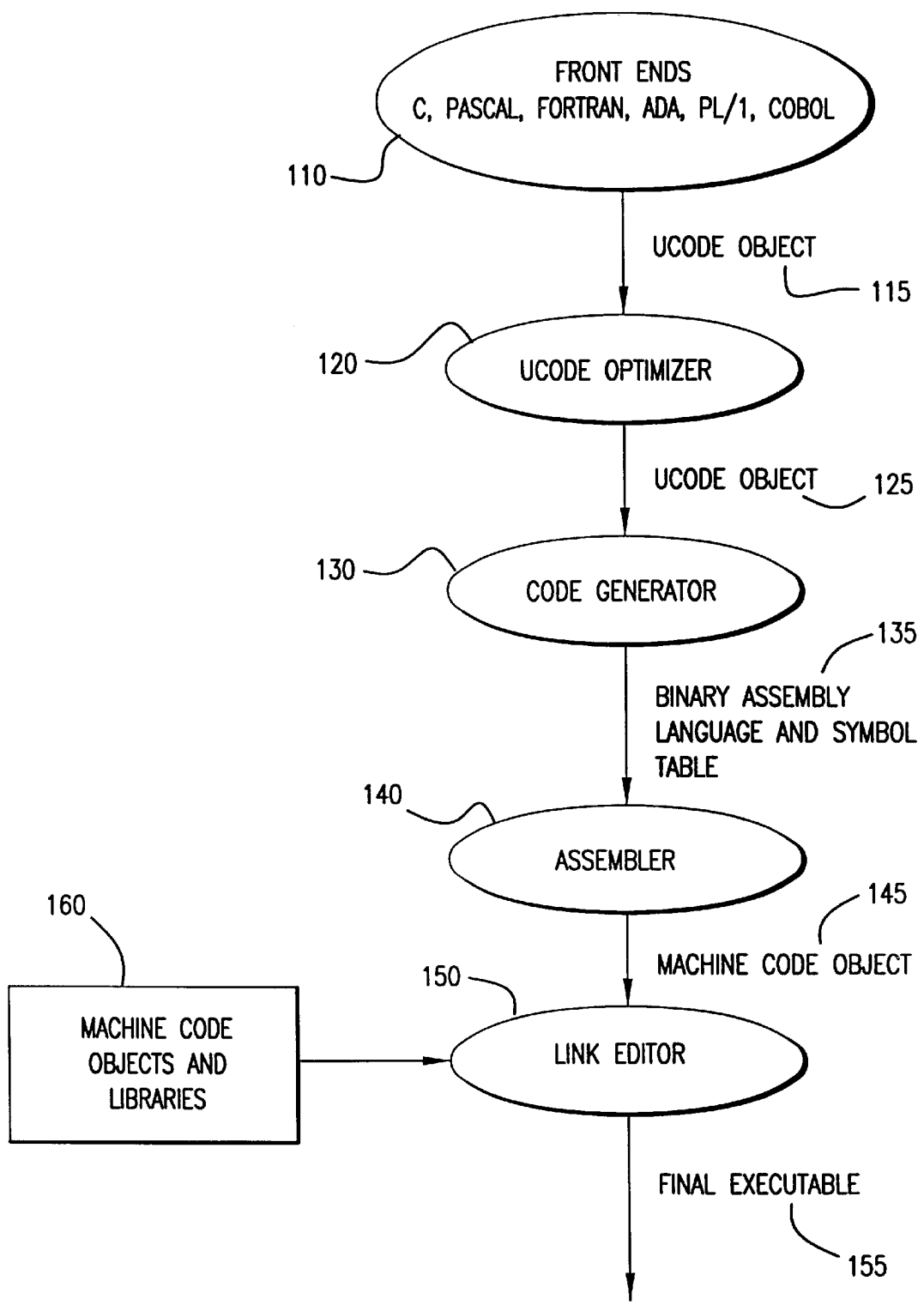
FIG. 1 illustrates the flow of a traditional compiler.
Figure 2:
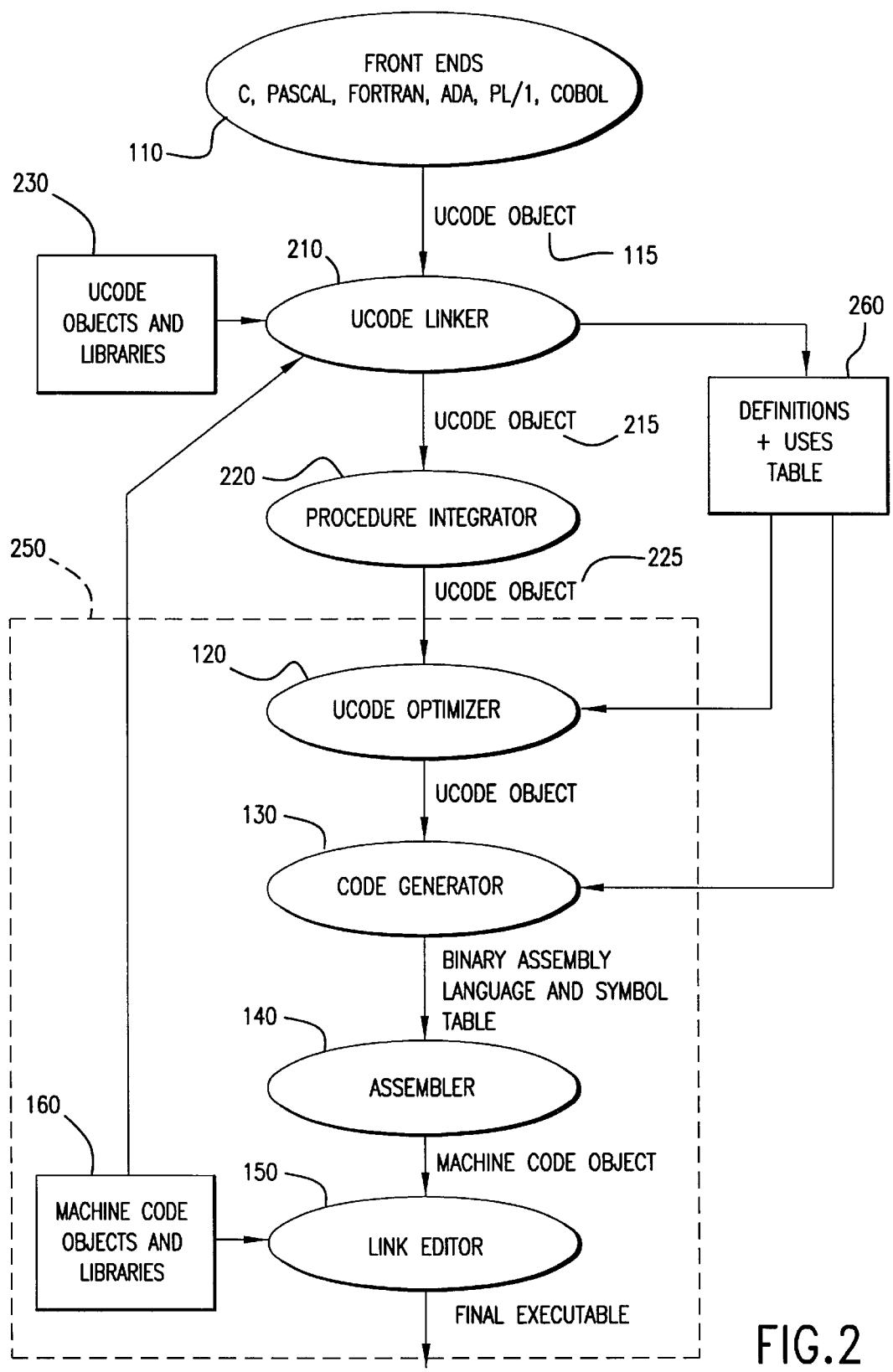
FIG. 2 illustrates the flow of a compiler with cross-module optimizations invoked in accordance with the present invention.

FIG. 2 illustrates the flow of a compiler with cross-module optimizations invoked. In addition to the traditional components found in a traditional compiler (FIG. 1), a compiler implementing cross-module optimization includes two extra phases: a Ucode linker 210 and a procedure integrator 220. Ucode linker 210 links ucode objects 115 and libraries together resulting in a Ucode object 215 representing many modules. The present invention modifies ucode linker 210 to accept (recognize) dynamically-linked libraries. Ucode linker 210 produces intermediate code that contains information about all symbol definitions and uses. The step is performed before the machine code is generated.

As stated above, modifications are made in ucode linker 210, as well as to code generator 130, assembler 140 and link editor 150. The procedure integrator 220 and ucode optimizer 120 are not changed.

The first change in ucode linker 210 is to support linking of dynamic shared libraries. Ucode linker 210 is modified to recognize the file format of dynamic shared libraries and process their symbol tables according to the rules and semantics specific to dynamic shared programs. Without this change, cross-module optimization on dynamically-shared programs is not possible at all.

Further, ucode linker 210 collects additional information about the definitions and references of each symbol and attaches this information as "attributes" to each symbol. These attributes include: (1) whether a symbol is defined in a dynamic shared library, a machine code object or a ucode object, (2) for text symbols (i.e., function and procedure names), whether they are or might be references by a dynamic shared library or machine code object (i.e., anything other than ucode objects), (3) for data symbols, whether they can be moved to the gp-relative data area (data area 370 or 375 in FIG. 3). These attributes are recorded in the symbol table that is passed down the subsequent compilation phase.

Code generator 130 is changed to recognize these new symbol attributes. Only (2) and (3) above are relevant to code generator 130. Functions and procedures that are never referenced by dynamic shared libraries and machine code objects are "internal" subroutines and do not need to compute a pointer to GOT 360 upon entry. This is possible because the callers to these subroutines are guaranteed to use the same GOT and thus the pointer to it remains unchanged. Also, for data placed in the gp-relative data area, code generator 120 creates the correct (optimized) assembly code to reference them.

Assembler 140 is changed to recognize attributes (1) and (3) above. References to symbols defined in dynamic shared libraries need to be addressed indirectly, while direct addressing can be used for symbols defined in ucode objects and machine code objects. Furthermore, references to data items placed in the gp-relative data area (as noted by attributes (3) and specified by code generator 130) are addressed via a 16-bit immediate offset from the GOT register.

Link editor 150 is changed so that is accepts linking a mixture of objects with direct addressing and indirect addressing code, and performs address relocation accordingly.

Procedure integrator 220 selectively expands procedure calls in-line based on user input or its own heuristics and produces a new Ucode object 225. The compiler then sends this new Ucode object 225 into the normal back-end compilation 250. Note that each Ucode object file contains two separate sections: Ucode instructions representing the program code, and a symbol table containing symbol (or variable) information used by a loader and debugger. To complete the compilation, the linker 150 links the resulting machine-code object with other machine-code objects that have been separately compiled.

Under the cross-module optimization model, the compiler combines separately-compiled intermediate-code objects and performs function in-lining, interprocedural register allocation, dead function removal, and many other optimizations that are not supported in the traditional model (see Himelstein, et al., "Cross-Module Optimizations: Its Implementation and Benefits," *Proc. Summer Usenix*, pp. 347–356 (June 1987)). All of these optimizations are done before the final machine code generation. Note that during this cross-module optimization phase, the compiler collects information concerning each symbol (or variable) from all the files that compose the program, including the shared libraries that it links with, and thus has knowledge of where each symbol is defined and in what type of object (e.g., ucode, machine) the symbol is defined. This latter type of information is referred to as an "attribute" of the symbol. The compiler automatically collects information across the source file boundary. The present invention records this information in a symbol table (i.e., a definitions/use table) 260 and passes it down to ucode optimizer 120 and code generator 130. Note that it is also contemplated that the symbol table will record only definitions and not uses. As a result of creating a symbol table, direct references can be generated for symbols defined in the executable module and indirect references can be generated for symbols defined in the shared libraries. Note that the shared library can change at run-time. As a result, the symbol table that is generated is by definition incomplete.

This optimization improves the performance in several ways. First, function call overhead within the main executable is reduced. There is no more memory reference for loading the address of the callee. Also, with the absolute address embedded as an immediate value in a jump-and-link instruction, the processor can potentially pre-fetch the next instruction without delay. Second, overhead for indirect references of data symbols is also eliminated. This optimization can have a significant effect on performance, especially when the symbols are referenced within a loop. Third, all symbols defined inside the main executable can be removed from GOT 360, and thus the amount of work performed by the run-time linker is reduced. Furthermore, since the size of GOT 360 is reduced, the compiler can put more global variables in the data area 350 close to GOT 360 and access these variables through a 16-bit immediate offset from the GOT register (see Chow et al., "How Many Addressing Modes are Enough?," *Proc. of the 2nd Intl. Conf. on Architectural Support for Programming Languages and Operating Systems*, pp. 117–121 (October 1987)). This is particularly important in the MIPS architecture where accessing data via an immediate offset from a register takes only one instruction, and is even faster than the normal direct addressing, which takes two instructions instead of one (see Heinrich, *MIPS R4000 User's Manual*, Prentice Hall, Englewood Cliffs, N.J. (1993)).

By eliminating indirect addressing, the performance of these programs are consistently better than the PIC versions. A comparison of the performance of several dynamically-linked programs against the statically-linked version is given in Ho, *Optimizing the Performance of Dynamically-Linked Programs*, USENIX 1995 Technical Conference on UNIX and Advance Computing Systems, Jan. 16–20, 1995, which is incorporated by reference herein.

In one embodiment, the present invention is a computer program product (such as a floppy disk, compact disk, etc. also referred to as a computer usable medium) comprising a computer readable media having control logic recorded thereon. The control logic, when loaded into memory 414 and executed by the CPU 416, enables the CPU 416 to perform the operations described herein. Accordingly, such control logic represents a controller, since it controls the CPU 416 during execution.

While the invention has been particularly shown and described with reference to preferred embodiments thereof, it will be understood by those skilled in the art that various changes in form and details may be made therein without departing from the spirit and scope of the invention.

What is claimed is:

1. A method for generating machine-code that includes an application program and one or more shared libraries to be executed, wherein the machine-code utilizes direct and indirect addressing, comprising:

(1) generating intermediate code from source code having two or more separate modules of code utilizing cross-module optimization, wherein said intermediate code includes information about symbol definitions in each of said separate modules of code, said intermediate code also includes information regarding the one or more libraries that will be linked at run-time;

(2) generating a definitions table that indicates where all of said symbol definitions are defined, wherein said definitions table is incomplete since said shared library can change at run-time;

(3) generating a machine-code object from said intermediate code by using said definitions table, wherein said machine-code object includes indirect addressing for all definitions in said definitions table that are not within said source code and direct addressing code for all definitions in said definitions table that are within said source code; and (4) linking said machine-code object with said one or more libraries.

2. The method of claim 1, further comprising the step of linking said machine-code object with other machine-code objects that have been separately compiled.

3. The method of claim 1, further comprising the step of generating a Ucode object based on said intermediate code, said Ucode object includes Ucode instructions representing said source program and a symbol table that contains symbol table information used by a loader and debugger.

4. The method of claim 3, wherein said step generating Ucode instructions combines separately-compiled intermediate-code objects and performs function in-lining, interprocedural register allocation, and dead function removal.

5. A computer program product, comprising:

a computer usable medium having computer readable program code means embodied in said medium for causing a computer to generate machine-code that includes an application program and one or more shared libraries to be executed, wherein the machine-code utilizes direct and indirect addressing, wherein said computer readable program code means incudes:

computer readable program code means for causing said computer to generate intermediate code from source code having two or more separate modules of code utilizing cross-module optimization, wherein said intermediate code includes information about symbol definitions in each of said separate modules of code, said intermediate code also includes information regarding the one or more libraries that will be linked at run-time;

computer readable program code means for causing said computer to generate a definitions table that indicates where all of said symbol definitions are defined, wherein said definitions table is incomplete since said shared library can change at run-time;

computer readable program code means for causing said computer to generate a machine-code object from said intermediate code by using said definitions table, wherein said machine-code object includes indirect addressing for all definitions in said definitions table that are not within said source code and direct addressing code for all definitions in said definitions table that are within said source code; and computer readable program code means for causing said computer to link said machine-code object with said one or more libraries.

6. The computer program product of claim 5, further comprising computer readable program code means for causing said computer to link said machine-code object with other machine-code objects that have been separately compiled.

7. The computer program product of claim 5, further comprising computer readable program code means for causing said computer to generate a Ucode object based on said intermediate code.

8. The computer program product of claim 7, further comprising computer readable program code means for causing said computer to perform function in-lining, interprocedural register allocation, and dead function removal.

* * * * *